# (12) United States Patent
Howard, Jr.

(10) Patent No.: US 9,120,295 B2
(45) Date of Patent: Sep. 1, 2015

(54) CHITOSAN FILMS TREATED WITH ORGANIC POLYHYDROXYALKYL COMPOUNDS AND LAMINATES MADE THEREFROM

(75) Inventor: Edward George Howard, Jr., Hockessin, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 2153 days.

(21) Appl. No.: 12/135,254

(22) Filed: Jun. 9, 2008

(65) Prior Publication Data

US 2009/0300832 A1 Dec. 10, 2009

(51) Int. Cl.
| | |
|---|---|
| *A01K 1/015* | (2006.01) |
| *A41D 13/00* | (2006.01) |
| *C08B 37/08* | (2006.01) |
| *B32B 33/00* | (2006.01) |
| *B32B 5/26* | (2006.01) |
| *B32B 9/02* | (2006.01) |
| *B32B 27/06* | (2006.01) |
| *C08J 5/18* | (2006.01) |
| *B32B 37/12* | (2006.01) |
| *C08K 5/053* | (2006.01) |

(52) U.S. Cl.
CPC . *B32B 33/00* (2013.01); *B32B 5/26* (2015.04); *B32B 9/02* (2013.01); *B32B 27/06* (2013.01); *C08J 5/18* (2013.01); *B32B 37/12* (2013.01); *B32B 37/1292* (2013.01); *B32B 2307/7145* (2013.01); *C08J 2305/08* (2013.01); *C08K 5/053* (2013.01); *Y10T 156/10* (2015.01)

(58) Field of Classification Search
CPC ........ C08J 2305/08; C08J 5/18; C08K 5/053; B32B 5/26
USPC .................. 428/221; 536/20; 2/457
See application file for complete search history.

(56) References Cited

U.S. PATENT DOCUMENTS

| | | | | |
|---|---|---|---|---|
| 2,040,880 | A | | 5/1936 | Rigby |
| 4,572,906 | A | * | 2/1986 | Sparkes et al. ................ 424/445 |
| 5,015,293 | A | | 5/1991 | Mayer et al. |
| 5,919,574 | A | | 7/1999 | Hoagland |
| 6,746,762 | B1 | * | 6/2004 | Hosoda et al. ................ 428/332 |
| 2007/0196404 | A1 | * | 8/2007 | Howard et al. ............... 424/402 |

FOREIGN PATENT DOCUMENTS

MX 2004PA01347 A 9/2004

OTHER PUBLICATIONS

U.S. Appl. No. 10/883,105, filed Jul. 1, 2004, Subramaniam Sabesan.
U.S. Appl. No. 11/593,958, filed Nov. 7, 2006, Edward George Howard, Jr.
Muzzarelli et al., N-(Carboxymethylidene) Chitosans and N-(Carboxymethyl)-Chitosans: Novel Chelating Polyampholytes Obtained from Chitosan Glyoxylate, Carbohydrate Research, 1982, vol. 107: 199-214.

(Continued)

*Primary Examiner* — Jennifer Chriss
*Assistant Examiner* — Camie Thompson

(57) ABSTRACT

Chitosan films that have been treated with a polyhydroxyalkyl compound and washed, and laminates made from the films are provided. This treatment lessens the film shrinkage. The films and laminates can be used to make a variety of finished articles that can be used to provide protection from hazardous chemical and biological agents.

13 Claims, 1 Drawing Sheet

(56) References Cited

OTHER PUBLICATIONS

Muzzarelli et al., Aspartate Glucan, Glycine Glucan, and Serine Glucan for the Removal of Cobalt and Copper From Solutions and Brines, Biotechnology and Bioengineering, 1985, vol. 27:1115-1121.

Cohen et al., Coating Processes, Kirk-Othmer Encyclopedia of Chemical Technology, 5th Edition, 2004,vol. 7:1-35.

J. Knaul et al., Methods for Improving the Mechanical Properties of Chitosan Fibers, Advances in Chitin Science, 1998, vol. 3:399-406.

M. Bodnar et al., Abstracts of Papers, 228th ACS National Meeting, Philadelphia, PA, United States, Aug. 22-26, 2004, Poly-179.

Huang et al., A Review on Polymer Nanofibers by Electrospinning and Their Applications in Nanocomposites, Composites Science and Technology, 2003, vol. 63:2223-2253.

Brzezinski et al., Structure and Properties of Microporous Polyurethane Membranes Designed for Textile-Polymeric Composite Systems, Fibres & Textiles in Eastern Europe, 2005, vol. 13:53-58.

Guide for the Selection of Chemical and Biological Decontamination Equipment for Emergency Responders, NIJ Guide 103-00, vol. 1, 2001.

Bettini et al., Physicochemical and Cell Adhesion Properties of Chitosan Films Prepared From Sugar and Phosphate-Containing Solutions, European Journal of Pharmaceutics and Biopharmaceutics, 2008, vol. 68:74-81.

Umemura et al., Modification of Chitosan by the Maillard Reaction Using Cellulose Model Compounds, Carbohydrate Polymers, 2007, vol. 68:242-248.

Hong et al., Properties of Polysaccharide-Coated Polypropylene Films As Affected by Biopolymer and Plasticizer Types, Packaging Technology & Science, 2005, vol. 18:1-9.

Srinivasa et al., Effect of Plasticizers and Fatty Acids on Mechanical and Permeability Characteristics of Chitosan Films, Food Hydrocolloids, 2007, vol. 21:1113-1122.

Trejo et al., Estimation of Water Vapor Permeability in Chitosan Based Films, Department of Biotechnology, Universidad Nacional Autonoma De Mexico, 2001, vol. 45:1-5.

* cited by examiner

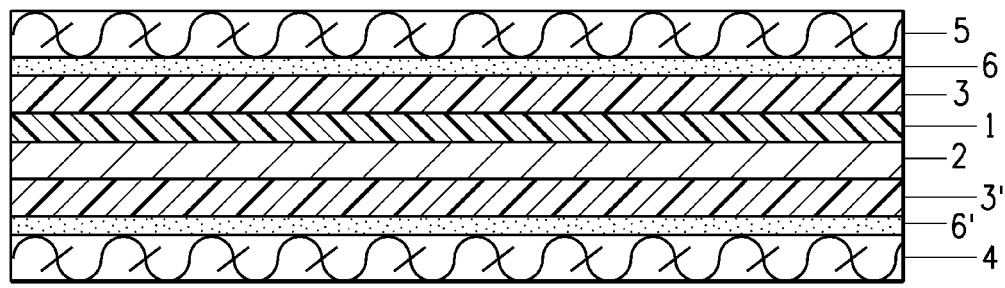

CHITOSAN FILMS TREATED WITH ORGANIC POLYHYDROXYALKYL COMPOUNDS AND LAMINATES MADE THEREFROM

TECHNICAL FIELD

The present invention relates to laminates prepared in part from continuous films of chitosan wherein the chitosan has been reacted with at least one polyhydroxyalkyl compound. In various embodiments, the laminates are useful for fabrication as a protective article and are preferably substantially impermeable to hazardous chemical and biological agents, but sufficiently permeable to water vapor that, if worn as protective apparel, it is both protective and comfortable to wear. The polyhydroxyalkyl compounds improve the dimensional stability of the films in water and upon drying.

BACKGROUND

There is a growing need for structures that provide personal protection against toxic chemical and biological agents. It is known to devise structures that are impermeable to toxic chemical vapors and liquids, but, when used as apparel, such structures are typically also hot, heavy and uncomfortable to wear.

The degree of comfort offered by apparel worn as a protective suit is significantly affected by the amount of water vapor that can permeate through the fabric from which the suit is made. The human body continuously perspires water as a method for controlling body temperature. When a protective fabric hinders the loss of water vapor from the body, the transpirational cooling process is hindered, which leads to personal discomfort. When a protective suit allows little or no loss of water vapor, extreme heat stress or heat stroke can result in a short period of time. Hence, it is desirable that, in addition to offering the highest levels of protection against toxic chemicals and liquids, a practical chemical and biological protective suit should have high water vapor transmission rates. It is also desirable that the appropriate protective structure be light in weight and offer the same high level of protection over a long period of time.

Co-pending U.S. patent application Ser. No. 11/593,958 relates to laminates prepared in part from continuous chitosan films. In various embodiments, the laminates are useful for fabrication as a protective article and are preferably substantially impermeable to hazardous chemical and biological agents, but sufficiently permeable to water vapor that, if worn as protective apparel, it is both protective and comfortable to wear.

The present invention provides selectively permeable laminates that contain a continuous chitosan film wherein the chitosan has been reacted with at least one polyhydroxyalkyl compound and that can be used in articles for personal protection, providing improved wearer comfort compared with impermeable articles. Such chitosan/polyhydroxyalkyl compound composite films exhibit lower shrinkage when dried, less swelling in water, and less sensitivity to dilute aqueous acid than do neat chitosan films.

SUMMARY OF THE INVENTION

One aspect of the present invention is a method of inhibiting the permeation of a chemically or biologically harmful agent through a laminate or a structure or item of apparel fabricated therefrom, by including within the laminate a continuous chitosan/polyhydroxyalkyl compound ("PHA") film.

Another aspect of the present invention is a protective structure comprising a continuous chitosan/PHA film. In some embodiments, the structure is a laminate further comprising at least one layer of fabric.

A further aspect of the present invention is a finished article incorporating a laminate that comprises a continuous chitosan/PHA film and at least one layer of fabric. Finished articles include items of apparel, shelters, and protective covers.

A further aspect of the present invention is a method for reducing shrinkage in a continuous chitosan film, comprising reacting with the chitosan at least one polyhydroxyalkyl compound and extracting excess, unreacted polyhydroxyalkyl compound from the film with water.

These and other aspects of the present invention will be apparent to one skilled in the art in view of the following description and the appended claims.

BRIEF DESCRIPTION OF THE DRAWINGS

FIG. 1 is a schematic diagram showing the structure of one type of selectively permeable laminate according to an embodiment of the present invention.

DETAILED DESCRIPTION

The term "film" as used herein means a thin but discrete structure that moderates the transmission of species in contact with it, such as gas, vapor, aerosol, liquid and/or particulates. A film may be chemically or physically homogeneous or heterogeneous. Films are generally understood to be less than about 0.25 mm thick.

The term "sheet" or "sheeting" as used herein means a film that is at least 0.25 mm thick.

Unless otherwise stated or apparent by the particular context, the term "chitosan" as used herein includes chitosan-based moieties including chitosan itself, chitosan salts, and chitosan derivatives.

The term "polyhydroxyalkyl compound" or equivalently "PHA compound" as used herein means a compound having an alkyl hydrocarbon chain that has two or more hydroxyl groups and is free of other oxygen containing functional groups, such as but not limited to aldehyde and ketone groups.

The term "chitosan/PHA film" or equivalently "chitosan/polyhydroxyalkyl compound film" as used herein means a film that contains at least one chitosan-based moiety in the amount of at least 50% by weight and wherein the chitosan has been reacted with at least one polyhydroxyalkyl compound.

The term "nonporous" as used herein denotes a material or surface that does not allow the passage of air other than by diffusion.

The term "continuous" as used herein denotes a film having at least one nonporous surface.

The term "permeable" as used herein means allowing liquids or gases to pass or diffuse through.

The term "selectively permeable" as used herein means allowing passage of certain species but acting as a barrier to others.

The term "laminate" as used herein means a material comprising two or more parallel layers of material that are at least partially bonded to each other.

The term "substrate" as used herein means the material onto which a film is formed from solution.

The term "work device" as used herein denotes a substrate which is used only for film formation and does not subsequently become part of a laminate.

The term "soluble" as used herein denotes a material that forms a visibly transparent solution when mixed with a specified solvent. For example, a water-soluble material forms a transparent solution when mixed with water, while a water-insoluble material does not.

The term "chitosan solution" as used herein indicates that at least one chitosan moiety is dissolved in the indicated solvent. However, materials that are insoluble in the indicated solvent may also be present.

The term "(in)solubilize" as used herein means to render a material (in)soluble in a specified solvent.

The term "harmful to human health" as used herein means causing injury to humans as a consequence of acute or chronic exposure through dermal contact, ingestion, or respiration.

In one embodiment, a method is provided for reducing shrinkage in a continuous chitosan film, comprising reacting the chitosan with at least one polyhydroxyalkyl compound.

In preferred embodiments, the chitosan/PHA films and laminates made therefrom are substantially impermeable to certain biological and/or chemical agents. It is often desirable that the films and laminates be at least 99% impermeable to certain agents, even up to 100% impermeable.

In one embodiment, the present invention provides a protective structure, fabricated from a continuous chitosan/PHA film or a selectively permeable laminate containing a continuous chitosan/PHA film. "Structure", as used herein with regard to structures fabricated from the continuous chitosan film, includes single layers and multiple layers of continuous chitosan/PHA films. The chitosan/PHA films described herein can be used to make laminates. The structures can be used in articles and items of apparel that protect against exposure to a chemical or biological agent that is harmful to human health. Specific embodiments include finished articles, including articles of apparel, fabricated from a continuous chitosan/PHA film or a selectively permeable laminate containing a continuous chitosan/PHA film.

In other embodiments, the invention provides methods of inhibiting the permeation of a chemically or biologically harmful agent through a selectively permeable laminate, or through an article or item of apparel fabricated therefrom, by including within the selectively permeable laminate a continuous chitosan/PHA film.

In further embodiments the invention provides methods of fabricating a structure that protects against exposure to a chemical or biological agent that is harmful to human health, and methods of fabricating items of apparel, by incorporating into a structure or item of apparel a selectively permeable laminate containing a chitosan/PHA film.

Because the laminates are selectively permeable, we have found that a structure fabricated therefrom provides a protective barrier that inhibits the permeation through the laminate, and thus through the structure, of chemical and biological agents that may be harmful to humans while maintaining sufficient water vapor permeability to maintain personal comfort when the laminate is used to fabricate an item of apparel.

The selectively permeable laminates described herein contain a continuous chitosan/PHA film. In one embodiment, the laminate is a chitosan/PHA film deposited from a solution of chitosan and at least polyhydroxyalkyl compound onto a substrate. In another embodiment, a chitosan/PHA film is obtained by contacting a preformed chitosan film, free-standing or adhered to a substrate, with an aqueous solution of at least one polyhydroxyalkyl compound. In another embodiment, the laminate is a chitosan/PHA film adhered to a layer, for example, polyurethane film by thermal bonding. In another embodiment, a continuous chitosan/PHA film or a film cast onto a substrate, or a film thermally bonded to another layer is bonded to one or more layers of fabric, by adhesive. The adhesive can be in the form of stripes or, preferably, dots, to provide a discontinuous layer of adhesive, in order not to block passage of gases and/or liquids through the selectively permeable laminate. FIG. 1 illustrates one embodiment of a selectively permeable laminate that could be used in, for example, an article of apparel. In the embodiment shown, the laminate contains the following elements a continuous chitosan/PHA film (1); a substrate to which the continuous chitosan/PHA film is adhered (2); additional layers (3, 3'); an inner liner (4); an outer shell (5) and adhesive (6, 6'). However, not all embodiments of the selectively permeable laminates contain all of the elements shown in FIG. 1.

Continuous Chitosan/PHA Film

Chitosan

Chitosan is the commonly used name for poly-[1-4]-β-D-glucosamine. It is commercially available and is chemically derived from chitin, which is a poly-[1-4]-β-N-acetyl-D-glucosamine that, in turn, is derived from the cell walls of fungi, the shells of insects and, especially, crustaceans. In the preparation from chitin, acetyl groups are removed by treatment with strong base, and, in the chitosan used herein, the degree of deacetylation is at least about 60%, and is preferably at least about 85%. As the degree of deacetylation increases, it becomes easier to dissolve chitosan itself in acidic media.

Suitable chitosan-based moieties include chitosan itself, chitosan salts, and chitosan derivatives. Representative examples of chitosan derivatives suitable for use in this invention include N- and O-carboxyalkyl chitosan. The number average molecular weight ($M_n$) in aqueous solution of the chitosan used herein is at least about 10,000.

Polyhydroxyalkyl Compounds

A polyhydroxyalkyl ("PHA") compound is a compound having an alkyl hydrocarbon chain that has two or more hydroxyl groups and is free of other oxygen containing functional groups (for example, aldehyde and ketone groups). It is preferred that at least one such alcohol group be primary, and more preferred that the polyhydroxyalkyl compound have at least two primary alcohol groups. Examples of polyhydroxyalkyl compounds free of other oxygen-containing functional groups include without limitation ethylene glycol, glycerine, erythritol, sorbitol, mannitol, pentaerythritol, triethanolamine, and 1,10-dihydroxydecane.

Continuous Film

The continuous chitosan/PHA films described herein exhibit lower shrinkage as dried after casting or when the cast film is subsequently wet (e.g., as would occur in a garment in the rain), then dried, than similarly prepared chitosan films made without a PHA compound. They also swell less in water and are insoluble in dilute aqueous acid solutions. They also exhibit higher tear resistance than similarly prepared chitosan films made without at least one PHA compound. The at least one PHA compound may be incorporated into a chitosan film by preparing a solution containing chitosan and the at least one PHA compounds and casting a film from the solution. Alternatively, the at least one PHA compound can be imbibed into a cast chitosan film by contacting an aqueous solution containing the at least on PHA compound with the surface of the chitosan film, whether the film is free-standing or adhered to a substrate. In either method, it is necessary to extract excess, unreacted polyhydroxyalkyl compound(s). Otherwise, the remaining, unreacted PHA compound(s) can plasticize the film to such a degree that the film will no longer provide an acceptable barrier to the permeation of harmful materials. The excess, unreacted PHA compounds are readily extracted with water, for example for about an hour at room temperature. Extraction efficacy will be a function of factors such as the specific film composition, film thickness, temperature, and extraction time. It is readily determined by, for example, gas-liquid chromatography (GLC) analysis of the extract.

A chitosan/PHA film may be cast from solution. If it is desired to cast the film from an aqueous solution, however, the chitosan is first solubilized, since chitosan itself is not soluble in water. Preferably, solubility is obtained by adding the chitosan to a dilute solution of a water-soluble acid. This allows the chitosan to react with the acid to form a water-soluble salt, herein referred to as a "chitosan salt" or "chitosan as the (acid anion) thereof", for example "chitosan as the acetate thereof" if acetic acid was used. Chitosan derivatives such as N- and O-carboxyalkyl chitosan that are water-soluble can be used directly in water without the addition of acid.

The acid used to solubilize the chitosan may be inorganic or organic. Examples of suitable inorganic acids include without limitation hydrochloric acid, sulfamic acid, hot sulfuric acid, phosphoric acid and nitric acid. Suitable organic acids may be selected from the group consisting of water-soluble mono-, di- and polycarboxylic acids. Examples include without limitation formic acid, acetic acid, pimellic acid, adipic acid, o-phthalic acid, and halogenated organic acids. Other suitable acids are disclosed in U.S. Pat. No. 2,040,880. Mixtures of acids may also be used. Volatile acids, that is, those with a boiling point less than about 200° C., are preferred.

The amount of acid used to solubilize the chitosan can be chosen to control the viscosity. If too little acid is added, the resulting solution may be too viscous to cast a thin film and/or to be filtered. The desired amount of acid used will also depend on the desired chitosan concentration in the final solution. It will depend as well on the molecular weight and degree of deacetylation of the starting chitosan, since those properties determine the molar concentration of amino groups (—$NH_2$) available to react with the acid. Preferably, about one acid equivalent is added per mole of chitosan amino group (—$NH_2$).

The chitosan/PHA film contains at least one chitosan-based moiety in the amount of at least 50% by weight and has been reacted with at least one polyhydroxyalkyl compound. In one embodiment, the at least one polyhydroxyalkyl compound and chitosan are present in a ratio of 1 part by weight PHA compound to about 2-50 parts by weight chitosan. In another embodiment, the at least one polyhydroxyalkyl compound and chitosan are present in a ratio of 1 part by weight PHA compound to about 3-50 parts by weight chitosan. The film is then subjected to heat and/or treatment with base to promote reaction between the chitosan and the PHA compound and insolubilize the film; this process is referred to as "curing." Unreacted excess polyhydroxyalkyl compound is then removed by water extraction. Otherwise, the unreacted PHA compound can plasticize the film (see, e.g., U.S. Pat. No. 5,919,574) to such a degree that the film will consequently provide less barrier to the permeation of harmful materials.

The PHA compound may be added to the chitosan solution, or chitosan salt or solution may be added to an aqueous solution of the PHA compound.

The appropriate concentration of chitosan in the final solution will vary depending on how the solution is to be applied, and also on the molecular weight of the chitosan, as a lower concentration may be desired for a relatively high molecular weight chitosan. Different application methods work best with solutions of different viscosities, but typically, the solution will contain from about 0.1 to about 15 wt % chitosan, based on the total combined weight of the solution and the chitosan. Because the polyhydroxyalkyl compounds have low molecular weights, their contribution to the solution's viscosity is negligible.

The solution from which the film is prepared may include organic polymers, including without limitation, natural polymers such as starch or cellulose, and synthetic polymers such as polyurethanes, polyamides, and polyesters. The organic polymer(s) can be added to a chitosan/PHA solution, or a solution can be made of the chitosan and organic polymer(s) to which at least one PHA compound is then added. Such polymers may be soluble or insoluble in the chitosan or chitosan/PHA solution. For example, a polyamide may be dissolved in a solution of chitosan and formic acid, while a polyurethane suspension in water would remain a suspension when added to a chitosan/acetic acid solution.

The solution from which the film is prepared may include inorganic fillers, including without limitation, glass spheres, glass bubbles, clays (e.g., sepiolite, attapulgite, and montmorillonite) and the like. Small amounts of such fillers, preferably less than 10 wt %, could be used to increase thermal stability, modulus, and barrier properties of the chitosan film where this is desirable.

The solution from which the film is prepared may include additives such as flame retardants, plasticizers, stabilizers, tougheners, and the like, to enhance various properties of the chitosan/PHA film such as strength, flexibility, fire resistance and dimensional stability. For example, flexibility of the film when wet can be enhanced by addition of ketoacids such as glyoxylic acid and levulinic acid, which react with chitosan to form N-(carboxymethylidene) chitosans (see, e.g., R. A. A. Muzzarelli et al., Carbohydrate Research (1982), 107, 199-214; R. A. A. Muzzarelli et al., Biotechnology and Bioengineering (1985), 27, 1115-1121). N-(carboxymethylidene) chitosans can be insolubilized by heat-treating and are physically flexible in the presence of moisture. The properties of the film may be enhanced by the addition of sugars such as glucose and fructose to the solution from which the film is formed. Additives may be soluble in the solution, or they may be present as dispersed insoluble material. Adding sugars and di- or multi-functional acids can reduce the thermal requirements for rendering the chitosan insoluble. With these additives, annealing temperatures of about 100° C.-120° C. for about 1 to 10 minutes cause insolubility. The additives are present at less than 50% by weight, based on the weight of chitosan plus PHA compound(s) plus additives.

A chitosan/PHA film may be prepared by casting a chitosan/PHA solution directly onto a substrate that will be incorporated along with the film into a laminate. Alternatively, the solution may be cast onto a work device such as a smooth surface, such as glass or a polymer film (for example, polyester film). If the film is cast onto a work device, the film is then dried, detached and then incorporated into a laminate in a separate step.

The solution may be applied to a substrate by any of a variety of methods known in the art. For a small scale process, such as a laboratory test sample, the solution is typically applied using a doctor knife. Methods available to coat surfaces which are planar and have irregular surfaces include without limitation spray coating, dip coating, and spin coating. In a commercial process, the solution could be applied to, e.g., traveling web using methods that include without limitation reverse roll, wire-wound or Mayer rod, direct and offset gravure, slot die, blade, hot melt, curtain, knife over roll, extrusion, air knife, spray, rotary screen, multilayer slide, coextrusion, meniscus, comma and microgravure coating. These and other suitable methods are described by Cohen and Gutoff in "Coating Processes" in the *Kirk-Othmer Encyclopedia of Chemical Technology* [John Wiley & Sons, 5$^{th}$ edition (2004), Volume 7, Pages 1-35]. The method chosen will depend on several factors, such as the rheology of the solution to be applied, the desired wet film thickness, the speed of a substrate that is traveling, and the required coating accuracy as a percent of total thickness.

The applied solution is then dried by any suitable means known in the art such as exposure to a hot air oven, air impingement drying, or radiative (e.g. infrared or microwave) drying (See, generally, Cohen and Gutoff, op. cit.). The result of the drying at this stage is a continuous film. If the chitosan/PHA is dissolved in an aqueous solution of a volatile acid, that is, an acid whose boiling point is less than about 200° C., exposure to ambient air may be sufficient for drying, and drying will remove acid as well as water.

If a film at this stage is water-soluble, it can be made water-insoluble by heating; by reacting it with a crosslinking reagent; by treatment with a strong base; or by a combination of two or more of these methods. For example, a films cast from a formic acid solution can be made water-insoluble by heat treatment after the film has been formed and dried, for example, by heating at about 100° to about 260° C. for about 0.1 to about 60 minutes, or more preferably about 100° C. to 180° C. for about 1 to 10 minutes. The heat treatment also further reduces film shrinkage. Heat treatment plus the use of a crosslinking agent could also be used to render the chitosan/PHA film insoluble. The film is always extracted at some stage with water to remove the excess polyhydroxyalkyl compound, since excess PHA compound can plasticize the film to such a degree that the film will no longer provide an acceptable barrier to the permeation of harmful materials.

The film can also be made more insoluble by adding any of a variety of crosslinking agents to a solution before a film is cast therefrom. A crosslinking agent is a reactive additive that creates bonds, i.e. crosslinks, between polymer chains. Examples of crosslinking agents for chitosan include without limitation glutaraldehyde (J. Knaul et al., Advances in Chitin Science (1998), 3, 399-406), epichlorohydrin (U.S. Pat. No. 5,015,293), and di-, and tri-carboxylic acids including succinic, malic, tartaric, and citric acids (M. Bodnar, Magdolna et al., Abstracts of Papers, 228th ACS National Meeting, Philadelphia, Pa., United States, Aug. 22-26, 2004 (2004), POLY-179). Diacids such as adipic acid or other multifunctional acids such as levulinic acid, glyoxylic acid or halogenated organic acids, can be used to make the chitosan solution. With these additives, temperatures of about 100° C.-120° C. for about 1 to 10 minutes can cause insolubility. Crosslinking agents may also be applied to the film after it is dried.

The film can also be made water-insoluble by contacting the film with a base and then washing with water. The washing step can also be used to extract excess polyhydroxyalkyl compound from the film. If the film to be treated with base is attached to a substrate, the composition and concentration of the base will be influenced by the nature of the substrate (e.g., its reactivity toward base) and processing conditions (e.g., temperature and contact time, continuous versus batch process). Typically, the base is a 1% to 10% by weight aqueous solution of sodium hydroxide, and typical contact times are 30 seconds to 3 hours at ambient temperature. Heat treatment plus contact with base could also be used to render the film insoluble.

Substrate Materials

Although a free-standing chitosan/PHA film can be incorporated into a protective article, it can also be adhered to a substrate. Referring to FIG. 1, a chitosan/PHA film (1) may be prepared by casting a chitosan/PHA solution directly onto a substrate (2) that will be incorporated along with the film into a laminate. It can also be cast on a work surface like PET film and coated with an additional layer or layers before or after the work surface is removed and discarded. In certain cases, the substrate onto which a film may be prepared may itself be a continuous sheet or film, provided that the permeability of the substrate to water vapor under use conditions is adequate for the particular end use. For example, a garment would require much higher water vapor permeability than a tent or tarpaulin.

A suitable substrate will have at least one surface that is smooth, i.e., essentially without protrusions above the plane of the substrate that are higher than the desired thickness of the cast solution that will be transformed into the film. Thus, a smoother substrate surface is required when the desired thickness of the cast solution is 25 µm than when it is 100 µm.

A suitable substrate may be, for example, a film, a sheet whose permeability to water vapor under use conditions is adequate for the particular end use, a microporous membrane (i.e., one in which the typical pore size is about 0.1 to 10 micrometers in diameter), or an article prepared from any of the foregoing. It is preferred that the substrate surface that will be in contact with the chitosan/PHA film be both smooth and nonporous. Suitable substrate materials include polar polymer films, including elastomers, glassy polymers, and semi-crystalline materials. A polar polymer has both dispersion and dipole-dipole forces, while a non-polar polymer has only dispersive attractive forces. Polar polymers generally contain a substantial fraction of oxygen and nitrogen containing groups, while non polar polymers contain a substantial fraction of hydrocarbon or fluorocarbon with minimal oxygen and nitrogen containing groups. These solutions can also be cast onto non-polar substrates by lowering the substrate surface tension by the addition of a suitable organic compound, such as isopropylalcohol, or a soap, particularly a cationic soap.

Examples of suitable substrate materials include without limitation Nafion® perfluorosulfonic acid tetrafluoroethylene copolymer (available from E. I. du Pont de Nemours and Company, Wilmington, Del., USA), polyurethanes (e.g., polyurethane films available from Omniflex Co., Greenfield, Mass., USA), polyether block polyamide copolymers (e.g., Pebax® polyether block amides available from Arkema, Paris, France), polyether block polyester copolymers, sulfonated styrene-polyolefin di- and tri-block copolymers, and polyvinyl alcohol homopolymers and copolymers.

Additional Layers

The protective laminates described herein comprise a continuous chitosan/PHA film and at least one layer of fabric. As appropriate, additional layers (for example, a second fabric layer or a microporous membrane) can be used in a laminate with the objective of (a) creating a composite structure that protects the chitosan/PHA film from an environment that may degrade its performance, and/or (b) creating a laminate, and potentially thus a composite structure thereof, that has features in addition to those offered only by the chitosan/PHA film and the at least one fabric layer, and/or (c) improving the performance of the final structure. For example, additional films or microporous membranes may be applied to the outer surfaces of the chitosan/PHA film and, where present, the substrate, as shown in FIG. 1 (3, 3') by coating, thermal lamination, and other means known in the art, to protect the chitosan/PHA and substrate films from dust and liquids or physical damage. One or more layers of ballistic fabrics can be used to absorb the impact of a projectile and protect the wearer from harm.

In many end uses, particularly apparel, the continuous chitosan/PHA film (and its associated substrate, where present) is incorporated into a structure that includes an outer layer of material (an "outer shell," (5) in FIG. 1) which is exposed to the environment and/or an inner liner (4).

The outer and inner materials may each be chosen for functional reasons such as ruggedness, ballistic resistance, and resistance to abrasion or tearing, as well as to impart a comfortable feel and a fashionable appearance to apparel. Colored and patterned materials may also be used as outer layers to introduce camouflage features in military applications. The outer shell and inner liner materials are typically fabric or microporous membranes.

Fabrics may be wovens or nonwovens (e.g., nonwoven sheet structures created by spun bonded/melt blown processes or by electrospinning as described in, e.g., Z.-M. Huang et al., Composites Science and Technology (2003), 63, 2223-2253). Fabrics may be prepared from any synthetic or natural fiber appropriate for the specific end use in mind. Preferred fabrics may be prepared from aramids, nylons, polyesters, cotton, and blends comprising any of these, such as, but not limited to blends of nylon and cotton fibers ("NYCO"). The term "nylon" as used herein refers to polyamides other than aramids. An aramid is an aromatic polyamide, wherein at least 85% of the amide (—CONH—) linkages are attached directly to two aromatic rings. Flame retardant fibers, including aramids (preferably up to 40%) may be blended with an aramid to impact fabric thermal performance and comfort. A suitable aramid may be in the form of a copolymer that may have as much as 10 percent of other diamine(s) substituted for the diamine of the aramid or as much as 10 percent of other diacid chloride(s) substituted for the diacid chloride of the aramid. A p-aramid would be preferred in a fabric as used in this p-invention, and poly(p-phenylene terephthalamide) (PPD-T) is the preferred p-aramid. M-aramids may also find use in the present invention, and poly (m-phenylene isophthalamide) (MPD-I) is the preferred m-aramid. P-aramid and m-aramid fibers and yarns particularly suitable for use in the present invention are those sold respectively under the trademarks Kevlar® and Nomex® (E. I. du Pont de Nemours and Company, Wilmington Del., USA), and Teijinconex®, Twaron® and Technora® (Teijin Ltd., Osaka, Japan), and equivalent products offered by others. Typically, the aramid fabric would be used in the outer shell, and the inner liner would more likely contain fabric such as polyester, nylon, cotton, or blends thereof, though m-aramids may be utilized as part of the inner liner as well to improve fire resistance Films and microporous membranes may be prepared from any synthetic or natural material appropriate for the specific end use in mind. Examples of films and microporous membranes that can be used as a component of inner liners or outer shells include without limitation expanded poly(tetrafluoroethylene) membranes such as those sold under the trademark GORE-TEX® (W. L. Gore & Associates, Inc., Newark, Del., USA); hydrophobic polyurethane microporous membranes (see, e.g., S. Brzeziński et al., Fibres & Textiles in Eastern Europe, January/December 2005, 13(6), 53-58); microporous (poly)propylene available from, e.g., 3M (St. Paul, Minn., USA); thin films of thermoplastic polyurethane such as those sold under the trademark Transport® Brand Film by Omniflex (Greenfield, Mass., USA); Pebax® polyether block amide by Arkema (Paris, France); and DuPont™ Active Layer, a polyester film available from E. I. du Pont de Nemours and Company (Wilmington, Del., USA).

Fabrication

The selectively permeable laminates described herein can be assembled using any of the any of the sewing, stitching, stapling or adhering operations, such as thermally pressing, known in the art.

Referring to FIG. 1, the layers to be assembled include the chitosan/PHA film (1) and at least one other layer. For example, if the chitosan/PHA film is cast on a work device, the film is then dried and detached as a free-standing film. Other layers could be added either before or after detachment from the work device. It may then be attached to another layer (for example, substrate (2), outer shell (5), inner liner (4)) using an adhesive (6, 6') such as a polyurethane-based adhesive. The adhesive may be present as a continuous layer, an array of adhesive dots, or in a number of alternative patterns such as lines or curves. The adhesive may be applied in a variety of ways including spraying or gravure roll.

To fabricate a structure or other article from a laminate disclosed herein, such as an item of apparel, the laminate may be sandwiched between (additional) woven fabrics. Bonding between the film structure and the fabrics may be continuous or semicontinuous, for example, with adhesive dots or films. Alternatively, the bonding may be discontinuous, for example by sewing the edges together, an arrangement often referred to as a "hung liner". Other means of discontinuous bonding may include the use of Velcro® strips or zippers.

Uses

The laminate, as well as the continuous chitosan/PHA film itself, is selectively permeable, having a Moisture Vapor Transmission Rate ("MVTR") of at least 2 kg/m$^2$/24 h, while the transmission rate of materials harmful to human health is low enough to prevent the occurrence of injury, illness or death. The specific transmission rate needed will necessarily depend on the specific harmful material; for example, NFPA 1994, 2006 Revision requires <4.0 µg/cm$^2$ one hour cumulative permeation for mustard and <1.25 µg/cm$^2$ for Soman, both of which requirements are met by the laminates and the continuous chitosan/PHA film it contains. Consequently, the laminates, as well as the continuous chitosan/PHA film itself, can be used for the fabrication of, or as a component in, a variety of articles of manufacture, including articles of protective apparel, especially for clothing, garments or other items intended to protect the wearer or user against harm or injury as caused by exposure to toxic chemical and/or biological agents, including without limitation those agents potentially used in a warfighter environment and materials identified as "Toxic Industrial Chemicals" (TICs) or "Toxic Industrial Materials" (TIMs); see, for example, *Guide for the Selection of Chemical and Biological Decontamination Equipment for Emergency First Responders, NIJ Guide* 103-00, *Volume I*, published by the National Institute of Justice, U.S. Department of Justice (October 2001), herein incorporated by reference. A few examples of TICs are phosgene, chlorine, parathion, and acrylonitrile. Permeability of the laminate or a layer in the laminate to specific substances may be determined by various methods including, without limitation, those described in ASTM F739-91, "Standard Test Method for Resistance of Protective Clothing Materials to Permeation by Liquids or Gases Under Conditions of Continuous Contact."

In one embodiment, the item of apparel is useful to protect military personnel against dermal exposure to chemical and biological agents potentially encountered in a warfighter environment. Examples of such agents include without limitation nerve agents such as Sarin ("GB," O-isopropyl methylphosphonofluoridate), Soman ("GD," O-Pinacolyl methylphosphonofluoridate), Tabun ("GA," O-Ethyl N,N-dimethylphosphoramidocyanidate), and VX (O-Ethyl S-2-diisopropylaminoethyl methylphosphonothiolate); vesicant agents such as sulfur mustards (e.g., Bis(2-chloroethyl)sulfide and Bis(2-chloroethylthio)methane); Lewisites such as 2-chlorovinyldichloroarsine; nitrogen mustards such as Bis-(2-chloroethyl)ethylamine ("HN1"); tear gases and riot control agents such as Bromobenzyl cyanide ("CA") and Phenylacyl chloride ("CN"); human pathogens such as viruses (e.g., encephalitis viruses, Ebola virus), bacteria (e.g., *Rickettsia rickettsii, Bacillus anthracis, Clostridium botulinum*), and toxins (e.g., Ricin, Cholera toxins). A human pathogen is a microorganism that causes disease in humans.

In a further embodiment, the item of apparel is useful to protect first responder personnel from known or unknown chemical or biological agents potentially encountered in an emergency response situation. In yet another embodiment, the item is intended to protect cleanup personnel from chemical or biological agents during a hazmat response situation. Examples of hazardous material in addition to those listed above include certain pesticides, particularly organophosphate pesticides.

Such clothing, garments or other items include without limitation coveralls, protective suits, coats, jackets, limited-use protective garments, raingear, ski pants, gloves, socks, boots, shoe and boot covers, trousers, hoods, hats, masks and shirts.

In another embodiment, the laminates can be used to create a protective cover, such as a tarpaulin, or a collective shelter, such as a tent, to protect against chemical and/or biological warfare agents.

Furthermore, the laminates can be used in various medical applications as protection against toxic chemical and/or biological agents. In one embodiment, the laminates could be used to construct items of apparel for health care workers, such as medical or surgical gowns, gloves, slippers, shoe or boot covers, and head coverings.

EXAMPLES

Specific embodiments of the present invention are illustrated in the following examples. The embodiments of the invention on which these examples are based are illustrative only, and do not limit the scope of the appended claims.

The meaning of the abbreviations used in the examples is as follows: "cm" means centimeter(s), "cP" means centipoise, "DMMP" means dimethylmethylphosphonate, "ePTFE" means expanded poly(tetrafluoroethylene), "g" means gram(s), "GC" means gas chromatography, "h" means hour(s), "kg" means kilogram(s), "m" means meter(s), "M" means molar, "mg" means milligram(s), "min" means minute(s), "mL" means milliliter(s), "mm" means millimeter(s), $M_n$" means number average molecular weight, "MVTR" means moisture vapor transmission rate, "$M_w$" means weight average molecular weight, "oz" means ounce(s), "Pa" means Pascal, "s" means second(s), "SEC" means size exclusion chromatography, "wt %" means weight percent, "yd" means yard(s), "µg" means microgram(s), and "µL" means microliter(s).

Unless otherwise specified, the water used is distilled or deionized water.

The chitosan used in the following Examples, ChitoClear® TM-656 chitosan, was obtained from the manufacturer, Primex Ingredients ASA, Norway. According to the manufacturer, ChitoClear® TM-656 has a Brookfield viscosity of 26 cP (0.026 Pa·s, 1% chitosan in a 1% aqueous acetic acid solution). The $M_n$ and $M_w$ were determined by SEC to be 33,000 and 78,000, respectively.

Methods

Standard Chitosan Salt Solution Preparation

This method was used to prepare chitosan solutions for the examples unless otherwise noted: A food blender cup is preheated in a boiling water bath, placed on the blender's motor, and charged with 564 g of hot water and 36 g of chitosan (0.22 mole —$NH_2$). While stirring strongly, 11.5 g (0.25 mole) formic acid is added. The formic acid is of 98% purity and is obtained from Aldrich Chemical Company (Milwaukee, Wis.). The viscosity increases immediately. After three minutes of stirring, the resulting viscous mass is poured into a Pyrex® glass bottle and heated for 1 h in a boiling water bath. Afterward, it is pressure filtered through coarse filter paper. The solution is cleared of bubbles after standing for three days at room temperature.

Standard Glass Plate Preparation

When films are to be cast onto a work device such as a glass plate, it is important that the glass plate surface be clean. The following cleaning procedure was used for the examples, but any thorough cleaning procedure would be suitable: A Pyrex® glass plate is washed with PEX lab soap, rinsed with water, and wiped dry. The plate is then cleaned with methanol and, finally, coated and rubbed with 10 wt % aqueous NaOH solution and allowed to stand for ten minutes. The plate is ready for casting after a final rinse with water and drying with soft paper towels.

Molecular Weight Determination

The molecular weights of the chitosan samples were determined by size exclusion chromatography ("SEC") using a triple-detector aqueous system, consisting of a Waters 2690 separations module, a Wyatt-DAWN DSP multi-angular (18) light scattering detector, a Waters 410 differential refractometer (Waters Corporation, Milford, Mass., USA), and a Viscotek T60-B viscometer (Viscotek, Houston, Tex., USA). Two TSK-GEL GMPW columns (TOSOH Bioscience LLC, TOSOH Corporation, Tokyo, Japan) were used. The mobile phase was an aqueous solution of 0.3M acetic acid with 0.3M sodium acetate at a flow rate of 0.5 mL/min. The samples were first dissolved for 4 hours in a shaker.

Moisture Vapor Transmission Rate (MVTR)

This was measured by a method derived from the Inverted Cup method of MVTR measurement [ASTM E 96 Procedure BW, Standard Test Methods for Water Vapor Transmission of Fabrics (ASTM 1999)]: A vessel with an opening on top is charged with water and then the opening is covered first with a moisture vapor permeable (liquid impermeable) layer of expanded-PTFE film ("ePTFE"), and then with the sample for which the MVTR is to be measured, and finally by woven fabric overlayer [NYCO 50:50 nylon/cotton blend, 6.7 oz/yd² (0.23 kg m²) or Nomex® fabric, 5.6 oz/yd² (0.19 kg/m²), both treated with durable water repellant finish]. The three layers are sealed in place thereby forming a laminate, inverted for 30 minutes to condition the layers, weighed to the nearest 0.001 g, and then contacted with a dry stream of nitrogen while inverted. After the specified time, the sample is re-weighed and the MVTR calculated (kg/m²/24 h) by means of the following equation:

$$MVTR=1/[(1/MVTR_{obs.})-(1/MVTR_{mb})]$$

where $MVTR_{obs}$ is observed MVTR of the experiment and $MVTR_{mb}$ is the MVTR of the ePTFE moisture barrier (measured separately). The reported values are the average of results from four replicate samples.

Dimethylmethylphosphonate ("DMMP") Permeation

DMMP is used as a relatively non-toxic simulant for chemical warfare G-class nerve agents. The DMMP permeation for the examples described below was carried out as follows: A vessel with an opening on top was charged with a measured amount of water containing 0.100% propylene glycol as an internal GC standard. If the sample was a film, the opening was covered with the sample film and a woven fabric overlayer [NYCO 50:50 nylon/cotton blend, 6.7 oz/yd² (0.23 kg/m²) or Nomex®, 5.6 oz/yd² (0.19 kg/m²), both treated with durable water repellant finish] was placed on top of the film, and the layers were sealed in place thereby forming a laminate. If the sample was a laminate that already had a fabric surface, no additional fabric overlayer was used. In both types of samples, the fabric surface was treated with one 2 µL drop of DMMP (2.3 mg). The vessel was placed in a nitrogen-purged box for 17 h and then the DMMP concentration in the water was measured by GC analysis. Results are reported in µg of DMMP measured in the water after 17 h and are the average of five replicate samples. The DMMP was obtained from Aldrich Chemical Company (Milwaukee, Wis., USA) and was used as received.

Linear Shrinkage Measurements

Linear shrinkage was determined using this method: Strips of the films to be tested, usually about 1 cm wide and 3 to 6 cm long are placed in a shallow dish with water and soaked for about 10 to 20 minutes. Water pickup is visually rapid and typically appears to be complete in less than one minute. When water pickup appears to be complete, the strips are gently floated onto a glass microscope slide with an excess of water. The wet films are slid off the microscope slide onto a paper sheet and the length of each wet film strip is measured ("wet length"). As the films dry, they are periodically gently moved to prevent sticking to the paper, since sticking would inhibit shrinkage. When completely dry under ambient conditions, the film lengths are again measured ("dry length"). The percent linear shrinkage for each film strip is calculated as 100 (wet length−dry length)/wet length.

Example 1

This experiment illustrates the result of extracting excess PHA compound (here, glycerine) from a chitosan/PHA film.

To 50 g of a 6 wt % solution of chitosan (3 g) as the formate in water at 90° C. was added 1 g of glycerine. The mixture was rotated for 30 minutes, then allowed to stand to allow the bubbles to rise out of the clear solution. A 20 mil (0.51 mm) casting on glass was dried at 100° C., then enclosed in an aluminum foil envelope and heated at 200° C. for 15 seconds. The film (Sample 1A) was soft, limp, and strong, not stiff like a typical chitosan film.

Part of the film was then extracted for 1 hour with water to remove the excess glycerine and dried (Sample 1B).

The films were then tested for water and simulant (DMMP) permeation. The results, shown in Table 1, indicate that extracting the, excess glycerine improved the barrier to DMMP 206-fold while maintaining MVTR.

TABLE 1

| | Sample | |
|---|---|---|
| | 1A (Unextracted) | 1B (Extracted) |
| MVTR (kg/m²/24 h) | 34.5 | 34.5 |
| DMMP (µg in 17 h) | 206 | 1 |

Example 2

This example demonstrates the effect of glycerine on shrinkage.

To a 5 wt % solution of chitosan as the formate salt in water, was added enough glycerine to produce a dry film containing 25% glycerine. The casting (30 mil, 0.76 mm) on a glass plate was dried on a press platen at 104° C. for 4 to 7 minutes. Overheating was avoided to prevent premature reaction. The film was peeled from the plate, placed in an aluminum foil envelope and heated at 104° C. for 5 minutes in the press with both platens just touching the envelope. The film was submerged in 10 wt % aqueous sodium hydroxide for 2 minutes, washed with water to remove base and to extract excess glycerine, and then dried. The film was insoluble in dilute formic acid. MVTR, DMMP permeation rate, and linear shrinkage measurements are reported in Table 2, along with typical data for a similarly prepared chitosan film containing no glycerine.

TABLE 2

| | Sample | |
|---|---|---|
| | Chitosan/Glycerine | Chitosan |
| MVTR (kg/m²/24 h) | 21.7 | 20-33 |
| DMMP (µg in 17 h) | 0 | 0 |
| Shrinkage (%) | 18 | 35 |
| Soluble in dilute aqueous formic acid? | No | Yes |

Example 3

This example demonstrates the effect of 1,10-dihydroxydecane on shrinkage.

To 15 g of a 5 wt % solution of chitosan as the formate in water. was added 83 mg 1,10-dihydroxydecane. The mixture was rotated until the 1,10-dihydroxydecane dissolved, then cast on a glass plate with a 30 mil (0.76 mm) doctor knife. When completely dry, the film adhered to the glass too tightly to be removed, but when stored under a moist paper towel it could be carefully lifted from the glass. It was then placed in an aluminum foil envelope and heated at 135° C. for 2 minutes. The film was submerged in 10 wt % aqueous sodium hydroxide, washed with water to remove base and to extract excess 1,10-dihydroxydecane, and then dried. The film, 1.3 mil (33 μm) thick, was strong, resisted tearing when twisted and exhibited a linear shrinkage of 22%, versus 35% for a typical, similarly prepared chitosan film containing no 1,10-dihydroxydecane.

Example 4

This example demonstrates the effect of sorbitol plus heat treatment on chitosan film properties.

To 50 g of a 5 wt % solution of chitosan as the formate in water. was added 0.28 g sorbitol. The film was cast on glass using a 30 mil (0.76 mm) doctor knife and dried at 100° C., The film was divided into two parts. One part of the film was directly submerged in 10 wt % aqueous sodium hydroxide, washed with water to remove base and to extract excess sorbitol, and then dried. (Sample 4A).

The second part of the film was heated at 136° C. for 2 minutes and then submerged in 10 wt % aqueous sodium hydroxide, washed with water to remove base and to extract excess sorbitol, and then dried. (Sample 4B). Sample 4B was more resistant to tearing than either Sample 4A or a neat chitosan film. Also, Sample 4B did not dissolve in dilute aqueous acid whereas Sample 4A did.

Example 5

This example demonstrates the effect of erythritol plus heat treatment on chitosan film properties.

To 50 g of a 5 wt % solution of chitosan as the formate in water. was added 0.28 g erythritol. The film was cast on glass using a 30 mil (0.76 mm) doctor knife and dried at 100° C. The film was divided into two parts. One part of the film was directly submerged in 10 wt % aqueous sodium hydroxide, washed with water to remove base and to extract excess erythritol, and then dried. (Sample 5A).

The second part of the film was heated at 130° C. for 2 minutes and then submerged in 10 wt % aqueous sodium hydroxide, washed with water to remove base and to extract excess erythritol, and then dried. (Sample 5B). MVTR, DMMP permeation rate, and linear shrinkage measurements are reported in Table 3,

TABLE 3

| | Sample | |
|---|---|---|
| | 5A (Not heated) | 5B (Heated) |
| MVTR (kg/m$^2$/24 h) | 25.6 | 32.3 |
| DMMP (μg in 17 h) | 0 | 0 |
| Shrinkage (%) | 33 | 13 |
| Soluble in dilute aqueous formic acid? | Yes | No |

Example 6

This example demonstrates the effect of triethanolamine plus heat treatment on chitosan film properties.

The film casting solution was made up of 50 g of a 6 wt % solution of chitosan as the formate in water, 0.1 g formic acid, and 0.33 g triethanolamine. The film was cast on glass using a doctor knife and dried. The film was divided into two parts and placed in separate aluminum foil envelopes. One part of the film was heated at 135° C. for 3 minutes (Sample 6A) and the other part was heated at 135° C. for 5 minutes (Sample 6B). Both films were then submerged in 10 wt % aqueous sodium hydroxide, washed with water to remove base and to extract excess triethanolamine, and then dried on glass plates. The film properties are reported in Table 4.

TABLE 4

| | Sample | |
|---|---|---|
| | 6A (135° C., 3 min) | 6B (135° C., 5 min) |
| MVTR (kg/m$^2$/24 h) | 31.2 | 32.3 |
| DMMP (μg in 17 h) | 0 | 0 |
| Shrinkage (%) | 23 | 18 |
| Soluble in dilute aqueous formic acid? | No | No |

Example 7

This example demonstrates the effect of pentaerythritol and heat treatment on chitosan film properties.

To 50 g of a 5 wt % solution of chitosan as the formate in water. was added 0.58 g pentaerythritol. The mixture was rotated until the pentaerythritol was dissolved, then degassed under vacuum. The solution was cast onto a glass plate with a 30 mil (0.76 mm) doctor knife and dried at 100° C. The film was lifted from the plate and divided into two parts. The first part (Sample 7A) was submerged in 10 wt % aqueous sodium hydroxide for two minutes, washed with water to remove base and to extract excess pentaerythritol, and then dried. The second part (Sample 7B) was placed in an aluminum foil envelope and heated in a press (not under pressure) at 135° C. for 2 minutes, then submerged in 10 wt % aqueous sodium hydroxide for two minutes, washed with water to remove base and to extract excess pentaerythritol, and then dried. Measured properties are reported in Table 5. The heated sample (7B) demonstrated lower shrinkage.

TABLE 5

| | Sample | |
|---|---|---|
| | 7A (Not heated) | 7B (Heated) |
| MVTR (kg/m$^2$/24 h) | 26.3 | 27.8 |
| DMMP (μg in 17 h) | 0 | 0 |
| Shrinkage (%) | 33 | 10 |
| Soluble in dilute aqueous formic acid? | Yes | No |

Example 8

This example demonstrates the effect of pentaerythritol plus heat treatment on the properties of a film containing chitosan and nylon 4,6.

A solution of nylon 4,6 and chitosan in 98% formic acid was prepared from 63 g 98% formic acid, 2.63 g chitosan dried at 100° C., and 0.88 g nylon 4,6, so that the nylon 4,6 would be 25 wt % of the final composite film. The solution was pressure filtered thru filter paper before using.

To 20 g of the above solution was added 48 mg of pentaerythritol. The mixture was rolled until pentaerythritol solution was complete. After 3 days at 0° C., the bubbles had dissipated. The solution was cast onto clean a glass plate using a 30 mil (0.76 mm) doctor knife and dried at 100° C.

The dry film had to be covered with a moist paper towel because it adhered to the glass plate. The film was then lifted from the plate with the aid of a single edge razor blade that carefully cut at the leading edge of the glass/film interface. This film was placed in an aluminum foil envelope and heated in a press (not under pressure) at 135° C. for 5 minutes, submerged in 10 wt % aqueous sodium hydroxide for two minutes, washed with water to remove base and to extract excess pentaerythritol, and then dried (Sample 8A).

A second film was prepared in the same manner, but without pentaerythritol (8B).

Measured properties of both films are reported in Table 6. The sample with pentaerythritol exhibited lower shrinkage, higher MVTR, and equivalent barrier to DMMP.

TABLE 6

| | Sample | |
| --- | --- | --- |
| | 8A (Chitosan/nylon 4,6 with pentaerythritol) | 8B (Chitosan/nylon 4,6) |
| MVTR (kg/m²/24 h) | 52.6 | 20.5 |
| DMMP (μg in 17 h) | 0* | 0 |
| Shrinkage (%) | 14 | 36 |

*The five test results were 0, 0, 0, 0, and 29. The 29 was omitted as having apparently been caused by a physical imperfection in the film.

What is claimed is:

1. A selectively permeable protective structure comprising:
   (a) a continuous chitosan/polyhydroxyalkyl film and
   (b) at least one layer of fabric,
   wherein the film is obtained by a process comprising the steps:
   (i) subjecting chitosan and at least one polyhydroxyalkyl reactant to heat to promote a reaction between the chitosan and the at least one polyhydroxyalkyl reactant to form a crude chitosan/polyhydroxyalkyl film, and
   (ii) extracting the crude film with water to remove unreacted polyhydroxyalkyl reactant to obtain the chitosan/polyhydroxyl film.

2. The selectively permeable structure according to claim 1 wherein the film further comprises one or more members selected from the group consisting of natural polymers, synthetic polymers, crosslinking agents, fillers, flame retardants, plasticizers, tougheners, and stabilizers, and wherein the film comprises at least 50% treated chitosan by weight.

3. The selectively permeable structure according to claim 1 further comprising a substrate onto which the chitosan/polyhydroxyalkyl film is cast from solution, wherein the substrate is essentially without protrusions above the plane of the substrate that are higher than the desired thickness of the cast solution that will be transformed into the film.

4. The selectively permeable structure according to claim 3 wherein the substrate is selected from the group consisting of films, sheets, and microporous membranes.

5. The selectively permeable structure according to claim 3 wherein the substrate comprises at least a film of one material selected from the group consisting of polar polymers wherein the polar polymer is an elastomer, glassy polymer, or semi-crystalline material.

6. The selectively permeable structure according to claim 5 wherein the polar polymer is selected from the group consisting of perfluorosulfonic acid tetrafluoroethylene copolymers, polyurethanes, polyether block polyamide copolymers, polyether block polyester copolymers, sulfonated styrene-polyolefin di- and tri-block copolymers, and polyvinyl alcohol homopolymers and copolymers.

7. The selectively permeable structure of claim 1 further comprising an outer shell, and optionally an inner liner, each independently comprising at least one member of the group consisting of woven fabric, nonwoven fabric, films, and microporous membranes.

8. The selectively permeable structure according to claim 7 wherein the woven or nonwoven fabric comprises one or more members selected from the group consisting of aramid, polybenzimidazole, nylon, and cotton.

9. The selectively permeable structure according claim 1 further comprising at least one additional layer.

10. A finished article comprising the selectively permeable structure according to claim 1.

11. The finished article according to claim 10 wherein said article is selected from the group consisting of items of apparel, shelters, and protective covers.

12. An item of apparel according to claim 11 wherein the item of apparel is selected from the group consisting of coveralls, protective suits, coast, jackets, limited-use protective garments, raingear, ski pants, gloves, socks, boots, shoe or boot covers, trousers, hoods, hats, masks, shirts and medical garments.

13. A medical garment according to claim 12 wherein the medical garment is selected from the group consisting of medical or surgical gowns, gloves, slippers, shoe or boot covers, and head coverings.

* * * * *